(12) United States Patent
Dobek et al.

(10) Patent No.: US 11,476,480 B2
(45) Date of Patent: Oct. 18, 2022

(54) STEAM GENERATOR FOR FUEL CELL APPLICATIONS

(71) Applicant: FuelCell Energy, Inc., Danbury, CT (US)

(72) Inventors: Frank Dobek, Colchester, CT (US); Stephen Jolly, Southington, CT (US); Keith Davis, Southbury, CT (US)

(73) Assignee: FuelCell Energy, Inc., Danbury, CT (US)

( * ) Notice: Subject to any disclaimer, the term of this patent is extended or adjusted under 35 U.S.C. 154(b) by 147 days.

(21) Appl. No.: 15/710,591

(22) Filed: Sep. 20, 2017

(65) Prior Publication Data

US 2019/0086074 A1 Mar. 21, 2019

(51) Int. Cl.
| | |
|---|---|
| *H01M 8/04* | (2016.01) |
| *H01M 8/0432* | (2016.01) |
| *F22B 1/28* | (2006.01) |
| *H01M 8/0612* | (2016.01) |
| *F22B 35/00* | (2006.01) |
| *F22D 5/26* | (2006.01) |
| *F22B 33/18* | (2006.01) |
| *H01M 8/04007* | (2016.01) |
| *H01M 8/0637* | (2016.01) |
| *H01M 8/12* | (2016.01) |

(52) U.S. Cl.
CPC ......... *H01M 8/04373* (2013.01); *F22B 1/284* (2013.01); *F22B 33/18* (2013.01); *F22B 35/00* (2013.01); *F22D 5/26* (2013.01); *H01M 8/04* (2013.01); *H01M 8/04037* (2013.01); *H01M 8/0618* (2013.01); *H01M 8/0637* (2013.01); *H01M 2008/1293* (2013.01)

(58) Field of Classification Search
None
See application file for complete search history.

(56) References Cited

U.S. PATENT DOCUMENTS

| | | | |
|---|---|---|---|
| 7,162,149 B2 | 1/2007 | Evans | |
| 2005/0019627 A1* | 1/2005 | Ozeki | H01M 8/0612 429/429 |
| 2006/0000141 A1* | 1/2006 | Kuwabara | B01J 4/002 48/127.9 |

(Continued)

FOREIGN PATENT DOCUMENTS

| | | | | |
|---|---|---|---|---|
| CN | 104180517 A | * | 12/2014 | ............ C02F 9/02 |
| CN | 105276558 A | * | 1/2016 | ............ F22B 1/28 |
| GB | 2079908 A | * | 1/1982 | ............ F22B 1/28 |

*Primary Examiner* — Ula C Ruddock
*Assistant Examiner* — Tony S Chuo
(74) *Attorney, Agent, or Firm* — Foley & Lardner LLP

(57) ABSTRACT

A steam vaporizer assembly includes an internal steam generator having a vessel configured to hold water, a vaporizer unit having a heating element configured to heat the water to generate saturated steam; and a controller configured to: cause the heating element to heat the water to a stand-by temperature; and while maintaining a water level of the water in the vessel between two control points: maintain the water in the vessel at the stand-by temperature until steam generation is required, and when steam generation is required, heating the water in the vessel from the stand-by temperature to a temperature at or above a vaporization temperature of the water using a heating element, to generate the steam.

5 Claims, 13 Drawing Sheets

(56) References Cited

U.S. PATENT DOCUMENTS

| | | | |
|---|---|---|---|
| 2011/0269038 A1* | 11/2011 | Yukimasa | C01B 3/384 |
| | | | 429/423 |
| 2013/0106110 A1* | 5/2013 | Marley, II | F02C 6/00 |
| | | | 290/52 |
| 2017/0312718 A1* | 11/2017 | Tawfik | C01B 3/56 |
| 2019/0063741 A1* | 2/2019 | Landry | F24F 11/89 |

* cited by examiner

STEAM GENERATOR FOR FUEL CELL APPLICATIONS

STATEMENT OF GOVERNMENT RIGHTS

This invention was made with U.S. Government support under Energy Efficiency & Renewable Energy Award No. DE-FE0023186 awarded by the Department of Energy. The U.S. government has certain rights in this invention.

BACKGROUND

The present application relates to fuel cell systems and, in particular, to fuel cell systems with steam generators for production of high pressure steam.

A fuel cell is a device that directly converts chemical energy stored in hydrocarbon fuel into electrical energy by means of an electrochemical reaction. Generally, a fuel cell comprises an anode electrode and a cathode electrode separated by an electrolyte, which serves to conduct electrically charged ions. High temperature fuel cells, such as solid oxide fuel cells, operate by passing a reactant fuel gas through the anode, while oxidant gas containing carbon dioxide and oxygen is passed through the cathode. In order to produce a useful power level, a number of individual fuel cells are stacked in series.

Steam reforming of gaseous hydrocarbons is one way to provide fuel for fuel cells. Current high temperature fuel cell systems utilize external steam reformation (i.e. gas-fired or electric boilers), which increases complexity and cost of the system. Alternatively, existing internal steam reformation systems require heat that, when directly exposed to the fuel cell, causes uneven temperatures on ceramic layers of the fuel cell that can weaken and may cause structural damage to the fuel cell. Additional problems arise because of frequent mismatching between the heat requirement for steam reforming reaction and the heat available from the fuel cell section. This may lead to local sub-cooling around the entrance of reformer portion (inhomogeneous temperature distributions) that result in mechanical failure due to thermally induced stresses.

A need exists for improved technology, including a system for rapid steam generation in fuel cell applications.

SUMMARY

In certain embodiments, a method of producing high pressure steam in a fuel cell system includes generating steam in an internal steam generator of the fuel cell system by performing steps comprising feeding water into a vessel of the internal steam generator, heating the water to a stand-by temperature, and while maintaining a water level of the water in the vessel between two control points, maintaining the water in the vessel at the stand-by temperature until steam generation is required in the fuel cell system, and when steam generation is required in the fuel cell system, heating the water in the vessel from the stand-by temperature to a temperature at or above a vaporization temperature of the water using a heating element, to generate the steam.

In one aspect, the step of maintaining the water level includes opening a water feed valve to allow the water into the vessel when the water level drops below a lower control point and closing the water feed valve when the water level reaches an upper control point.

In one aspect, the step of maintaining the water in the vessel at the stand-by temperature is performed when the fuel cell system is in active operation.

In one aspect, the step of heating the water in the vessel from the stand-by temperature is conducted when the fuel cell system is not in active operation.

In one aspect, the stand-by temperature is at least 80° C.

In one aspect, the heating element is a low power density heater.

In one aspect, the heating element is an inductive heating coil positioned around the vessel exterior.

In one aspect, the steam is generated at generation rate of between 10 lb/hr and 40 lb/hr.

In another embodiment, a steam vaporizer assembly includes an internal steam generator comprising a vessel configured to hold water; a vaporizer unit comprising a heating element configured to heat the water to generate saturated steam; and a controller configured to: cause the heating element to heat the water to a stand-by temperature, and while causing a water level of the water in the vessel to be maintained between two control points, cause the heating element to maintain the water in the vessel at the stand-by temperature until steam generation is required, and, when steam generation is required, cause the heating element to heat the water in the vessel from the stand-by temperature to a temperature at or above a vaporization temperature of the water, to generate the steam.

In one aspect, the vaporizer unit comprises a water jacket configured to accept a flow of water via a water jacket inlet, a water level tube mechanically connected to the water jacket and configured to monitor the water level of the water jacket, a condensation pot disposed between the water jacket and the water level tube and configured to trap water droplets exiting the water jacket, and a water jacket outlet configured as a steam exit port.

In one aspect, the water level tube is electrically connected to a water feed valve configured to control the flow of water.

In one aspect, the water jacket comprises a steam filter configured for condensing mist above a surface of the water level.

In one aspect, the flow of water is 4 gal/hr.

In one aspect, the heating element comprises a plurality of heating rods at least partially incorporated into a heating rod mounting plate through a first surface of the heating rod mounting plate, a plurality of connector wires attached to a second surface of the heating rod mounting plate, wherein the first surface and the second surface are separated by a sealing means.

In one aspect, each of the plurality of heating rods has a diameter-to-length ratio in a range of 1:5 to 1:1000.

In one aspect, each of the plurality of heating rods has a power output in a range of 10 W to 10000 W.

In one aspect, the heating element is configured to alternate between a heating mode and a stand-by mode, wherein during stand-by mode, water temperature of the water level in the vaporizer unit is maintained at a temperature in a range of 80° C. to 95° C.

In another embodiment, a fuel cell system includes a steam vaporizer assembly according to an embodiment disclosed herein and a fuel cell, which includes an anode electrode, a cathode electrode, and an electrolyte separating the anode electrode and the cathode electrode, such that the steam vaporizer assembly is configured to provide steam to the fuel cell.

In one aspect, the fuel cell system is a high temperature fuel cell system configured to operate at a temperature in the range of 600° C. to 1000° C.

These and other advantageous features will become apparent to those reviewing the disclosure and drawings.

BRIEF DESCRIPTION OF THE DRAWINGS

FIG. 9 shows system conditions of start-up heating from an 80° C. hot stand-by; and FIG. 10 shows system conditions of start-up heating from a 90° C. hot stand-by.

(FIG. 11), 90° C. (FIG. 12), and 95° C. (FIG. 13).

DETAILED DESCRIPTION

High temperature fuel cells typically operate at temperatures between 600° C. (1100° F.) and 1000° C. (1800° F.), depending on the type of fuel cell, and produce waste heat as part of high temperature exhaust output by the fuel cells. Because solid oxide fuel cells operate at high temperatures, they are capable of internal reforming, which eliminates the need for an external reforming system and reduces complexity of the fuel cell system. The internal reforming also provides thermal management and eliminates requiring a separate stack thermal management system.

The steam reforming reaction converts natural gas, composed primarily of methane ($CH_4$), into hydrogen ($H_2$) and carbon monoxide (CO) by reacting it with water ($H_2O$) in the presence of a catalyst. In a separate side reaction, a water gas shift reaction consumes excess water in converting CO (produced in the steam reforming reaction) to $CO_2$, thereby producing additional $H_2$.

In operation, water generated from the electrochemical reaction is recycled back to the anode inlet to supply the reforming reaction with enough reactant such that no additional water needs to be added. When the fuel cell is not in active operation (e.g., during start-up or in hot stand-by), however, water cannot be generated internally within the fuel cell system and thus must be supplied as steam from an external source. The fuel cell is in active operation when it is producing power in a water neutral mode. For example, when the fuel cell system is producing 30% or more power load, it produces sufficient water and/or steam as a byproduct such that additional steam (i.e., from a steam vaporizer) is not required. The amount of steam supplied to the anode is critical since catalyst coking (i.e. catalyst deactivation) may occur if too little steam is supplied.

Aside from the amount of steam supplied to prevent coking, another important feature to fuel cell operation is the rate at which steam is injected into the fuel cell system. Water at the anode is rapidly consumed during a hot stand-by when the load is removed and so to prevent the water concentration from dropping too low, steam production must ramp to full flow in short periods of time.

Referring generally to the figures, disclosed herein is a fuel cell system comprising an internal steam reformation capable of rapidly generating a steady stream of water vapor from cold conditions or hot stand-by.

Description of an Exemplary Water Vaporizer and Method of Operation

Figure 1:
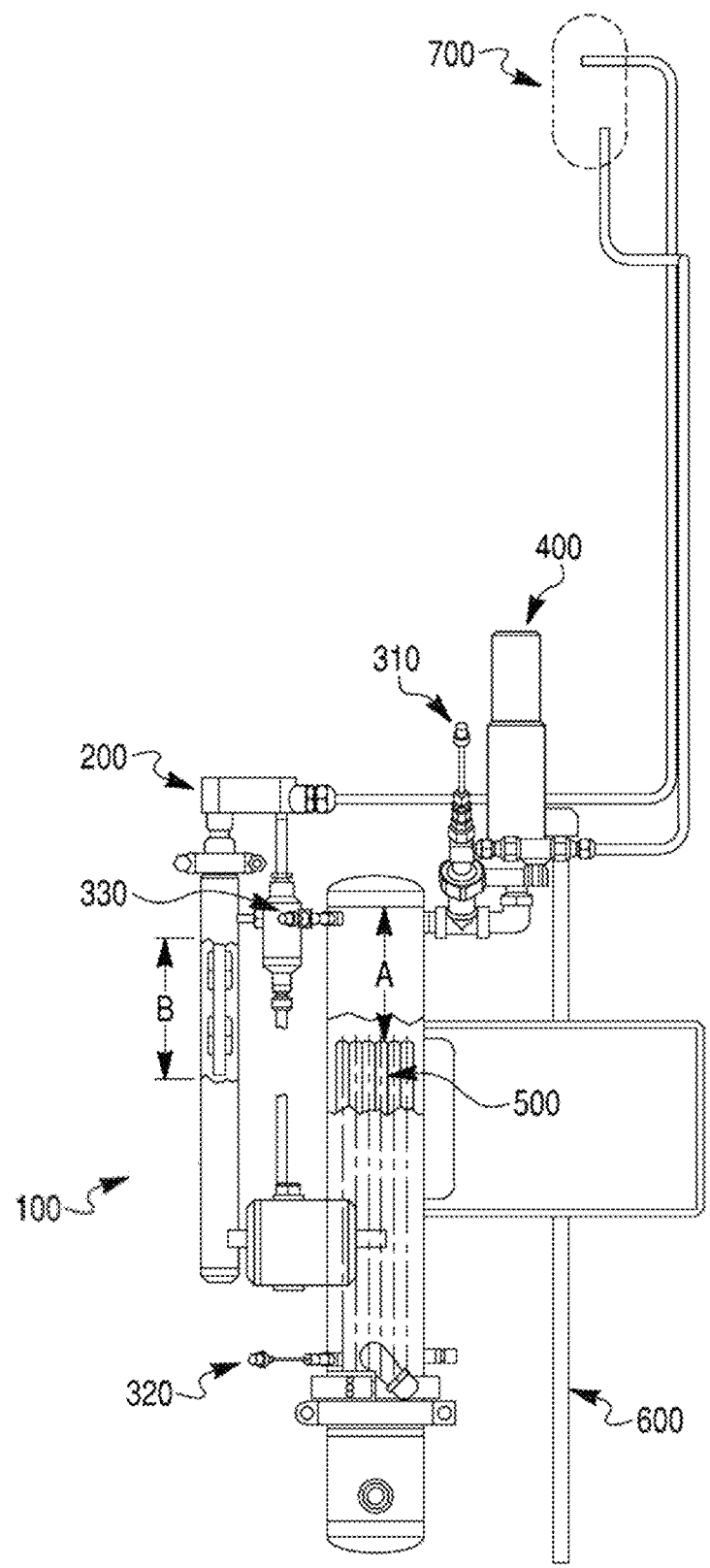
FIG. 1 illustrates an exemplary water vaporizer according to one embodiment.
Figure 2:
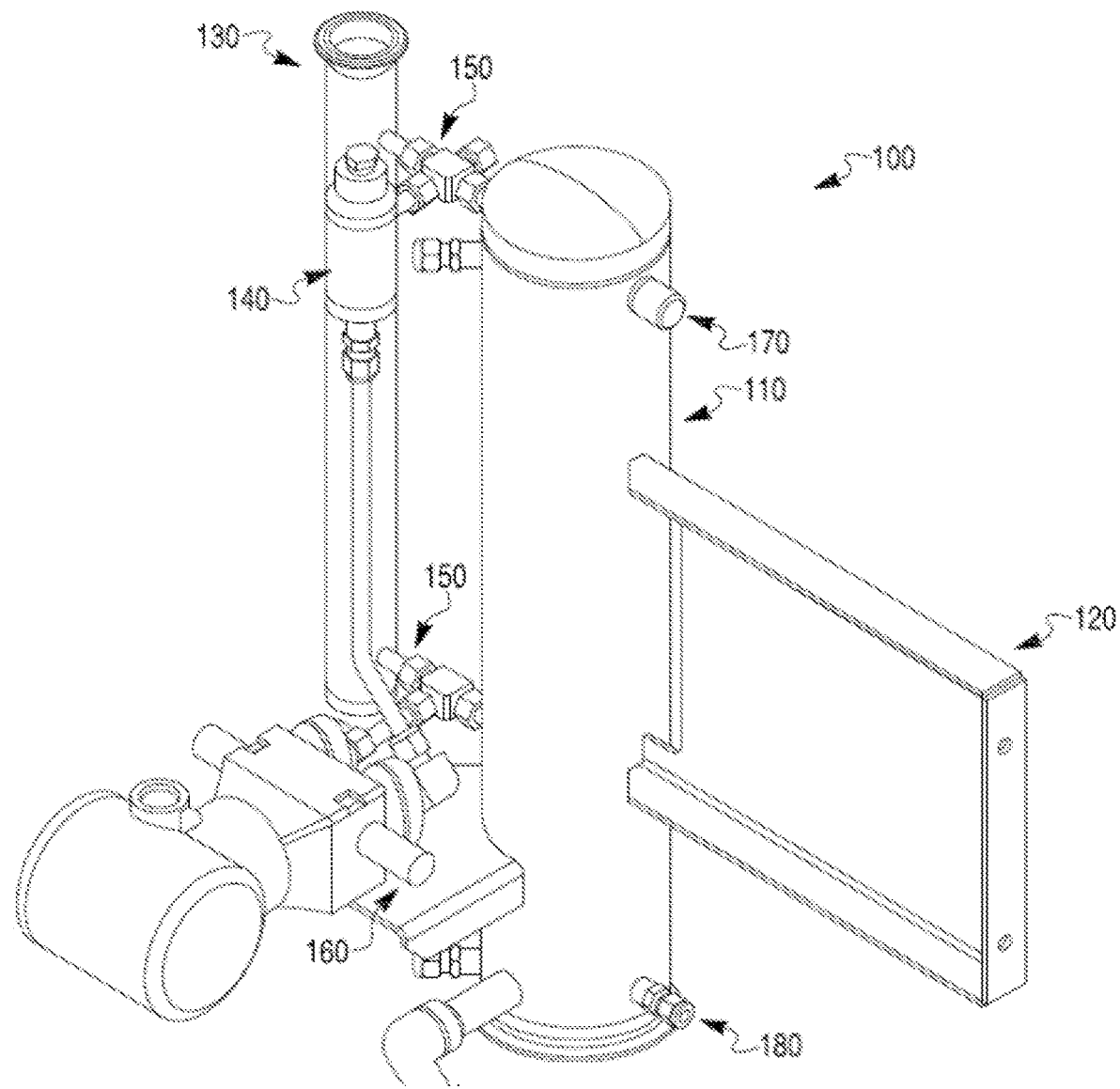
FIG. 2 illustrates an exemplary vaporizer unit of a water vaporizer according to one embodiment.
Figure 3:
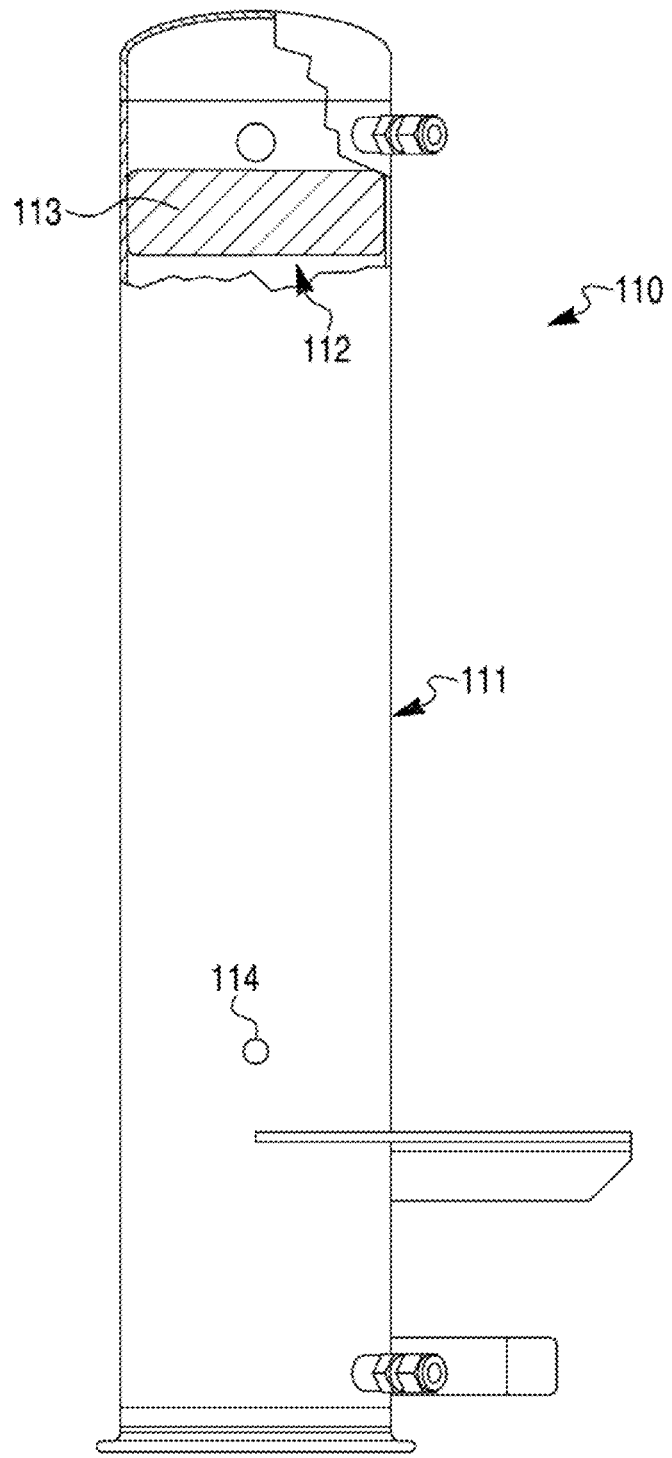
FIG. 3 illustrates an exemplary water jacket of a vaporizer unit according to one embodiment.
Figure 4:
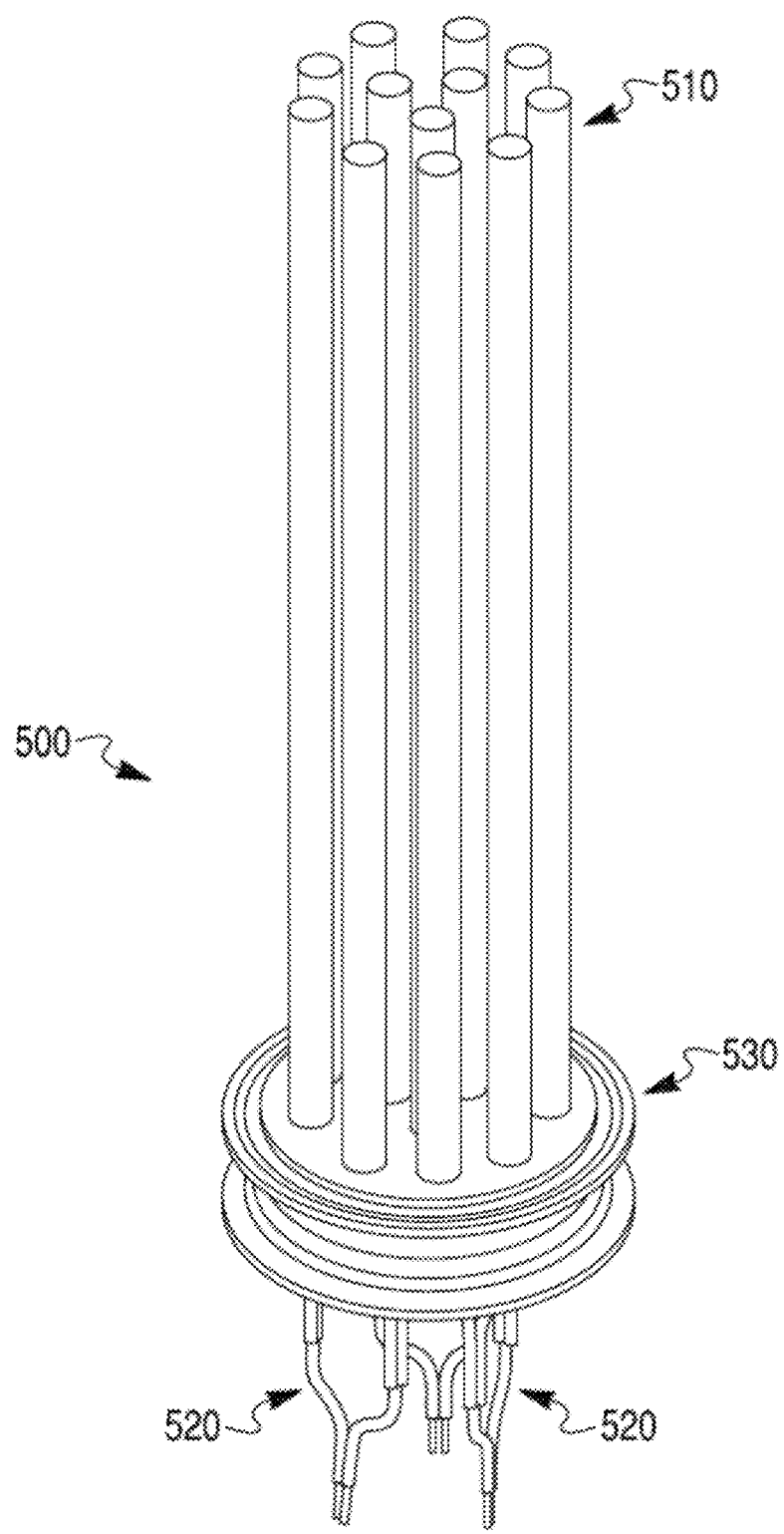
FIG. 4 illustrates an exemplary heating element of a water vaporizer according to one embodiment.

FIG. 1 illustrates an exemplary water vaporizer which includes a vaporizer unit 100, a float assembly 200, thermocouples 310, 320, and 330, pressure relief valve 400, heating element 500, venting tube 600, and steam differential pressure controller 700. In one embodiment, the vaporizer unit 100 of the water vaporizer includes a water jacket 110, a mount bracket 120, a water level tube 130, a condensation pot 140, water level tube connectors 150, mount plate 160, a water jacket outlet 170, and water jacket inlet 180 (FIG. 2). In one embodiment, the water jacket 110 includes a housing 111, screen 112, a steam filter 113, and water jacket connecters 114 (FIG. 3). The mount bracket 120 is used to secure the water vaporizer to a fuel cell structure. FIG. 4 illustrates an exemplary heating element 500 including heating rods 510, heating rod mounting plate 520, and connector wire 530.

Deionized (DI) water is fed into a housing 111 of the water jacket 110 through the water jacket inlet 180 at a controlled temperature and pressure. Flow of the DI water is monitored using a standard a rotameter. A water feed valve (not shown) is disposed between the DI water source feed and the water jacket inlet 180 to prevent water over flow of the water jacket 110. As the water enters the housing 111 and equilibrates in level, the temperature of water is monitored by a thermocouple 320. Inside the housing 111 is positioned a heating element 500 comprising a plurality of heating rods 510 at least partially incorporated into a heating rod mounting plate 520 from a first surface thereof. The first surface of the heating rod mounting plate 520 is sealed from a second, opposing surface to which is attached a plurality of connector wires 530. The seal isolates heating rods 510 from external environments to prevent electrical disruption or wire shorting. In one embodiment, the heating element is a resistive heating element. In one embodiment, the heating element is an inductive heating coil. The number and density of heating rods situated in the mounting plate 520 is variable and dependent on a desired heating capacity and power density. The heating rods have a diameter-to-length ratio in a range of 1:5 to 1:1000 or 1:10 to 1:100. Moreover, the heating rods have a heater wattage in a range of 10 W to 10000 W or 100 W to 5000 W. In one embodiment, each heating rod may have a diameter-to-length ratio of 1:20 and electrical output of 240 V and 1000 W. The heating element 500 is configured to alternate between a heating mode and a stand-by mode such that in stand-by mode, the water temperature is maintained at a temperature in a range of 80° C. to 95° C.

Water levels in the water jacket 110 are monitored using a water level tube 130 mounted atop a mount plate 160 and connected via connectors 150 to connectors 114 of the water jacket 110. In one embodiment, the connection between connectors 150 and connectors 114 is facilitated using stainless steel tubing attached on both ends with a nut-ferrule configuration. Thus, the water level tube 130 is exposed to the water in the water jacket 110 via the connection between connectors 150 and connectors 114 that is closest to the water jacket inlet 180. In response to the water level measured in the water level tube 130, a controller opens or closes the water feed valve disposed between the DI water source feed and the water jacket inlet 180.

Steam is generated as heat from the heating rods 510 vaporizes the water in the water jacket 110 and is initially housed in a space A between the top of heating rods 510 of heating element 500 and the water jacket outlet 170, from where the steam exits. Thus, the water level tube 130 is also exposed to the steam in the water jacket 110 via the connection between connectors 150 and connectors 114 that is closest to the water jacket outlet 170. Temperature of space A (i.e. vessel head temperature) is monitored using a thermocouple 330. In one embodiment, the water of the water jacket 110 is separated from space A by a steam filter 113 characterized by a screen 112 which serves as a condensation platform for mist hovering above the surface of the water. As the mist is captured and condensed onto the screen 112, gravitational forces will recycle the water droplets back into the supply of water.

When the water in the water jacket 110 is not subject to active heating, it may be held at stand-by temperatures of, for example, in a range of 80° C. to 95° C. At higher stand-by temperatures, the water levels in the water jacket 110 are more likely to vary than at lower stand-by temperatures (i.e. Table 4) due to more frequent water droplets exiting the housing 111. The exiting water droplets leave the housing 111 via the connection between connectors 150 and connectors 114 that is closest to the water jacket outlet 170 and are trapped in a condensation pot 140 disposed toward the top of the water jacket 110. Water captured in the condensation pot 140 is recycled back to water jacket 110.

Steam generated in the water vaporizer exits the housing 111 at the water jacket outlet 170. Temperature of the exiting steam is monitored by a thermocouple 310. The water vaporizer is operated to obtain a desired steam flow. For example, in one embodiment, to achieve a desired steam flow of approximately 12.5 lb/hr, the water vaporizer is operated at a differential pressure set-point of 6 psid (as measured and controlled by steam differential pressure controller 700) to produce saturated steam having a temperature about 230° F. (110° C.). At this operating differential pressure set-point, enough range in the system exists to allow for operation at a larger steam flow, if desired (i.e. 18.8 lb/hr at 12 psid). At an operating differential pressure set-point of 6 psid, the water level in the water jacket 110 was controlled by the water feed valve to have a flow rate of about 4 gal/hr (62±5 sec open and 98±5 sec closed for a total cycle time of 482±10 sec). The differential pressure controller 700 includes safety mechanisms in controlling water levels to remain in between a "high-high" set point, above which the water jacket 110 would flood, and a "low-low" set point, below which would cause the heating element 500 to burnout. The float assembly 200 monitors the variance from the high-high set point or variance from the low-low set point. Controlling the water level in this manner eliminates the need for precise flow control and provides for better operability of the vaporizer.

A pressure relief valve 400 is positioned downstream from the water jacket outlet 170 and configured to maintain a pressure (i.e. 14.9 psig) above which excess steam is vented via a venting tube 600.

Experimental Testing of an Exemplary Water Vaporizer

In one embodiment, the performance of a water vaporizer was tested to optimize start-up time and time to reach steady-state production of steam, determine effects of the rate of water inlet flow, and determine effects on start-up when holding the water at elevated temperatures. Test process conditions are summarized in Table 1.

TABLE 1

Test process conditions

| Feed | | Deionized (DI) H$_2$O |
|---|---|---|
| Steam Generation Rate (lb/hr) | Nominal | 12.5 |
| | Maximum | 36 |
| Steam Purity (%) | | >97 |
| Pressure (psig) | Desired Operating | 10.0 |
| | Maximum Operating | 12.0 |
| | Designed | 14.9 |
| Temperature (° F.) | Desired Operating | 239 |
| | Maximum Operating | 244 |
| | Designed | 300 |

Deionized (DI) water was fed into the water vaporizer vessel from a house supply and flow was monitored using a standard a rotameter. A pressure regulator positioned downstream from the water source and before a solenoid water feed valve was configured to maintain a pressure (14 psig) such that a desired water flow rate of approximately 4 gallons/hour through the solenoid water feed valve was achieved.

Rough estimations on the resultant steam flow were calculated by changing the water source from the house supply to a bladder tank containing DI water and recording differences in weight of the water in the bladder tank over time. Compressed air was forced into the bladder tank at about 20 psig to ensure sufficient water pressure was available. The pressure regulator was maintained at the same pressure as when the house supply was used as the water source to achieve a water flow rate of approximately 4 gallons/hour through the solenoid water feed valve. Cycle times were monitored as verification for consistent operating conditions, which each cycle comprising the time required to complete three open and close cycles of the solenoid water feed valve (i.e. commencing when the solenoid water feed valve is opened the first time and concluding when the valve is closed the third time).

Calibration curves were constructed to relate steam flow at vessel exit orifices to differential pressure set-point, which thereby allowed control of water into the vaporizer vessel. Rather than requiring a precise control of water flow into the vaporizer vessel to maintain acceptable levels, certain embodiments disclosed herein directly control the liquid level inside the vessel using a differential pressure controller with high and low set points. The differential pressure controller also includes safety mechanisms in controlling water levels to remain between a "high-high" set point, above which the vessel would flood, and a "low-low" set point, below which would cause heater burnout. Controlling the water level in this manner eliminates the need for precise flow control and provides for better operability of the vaporizer.

Figure 5:
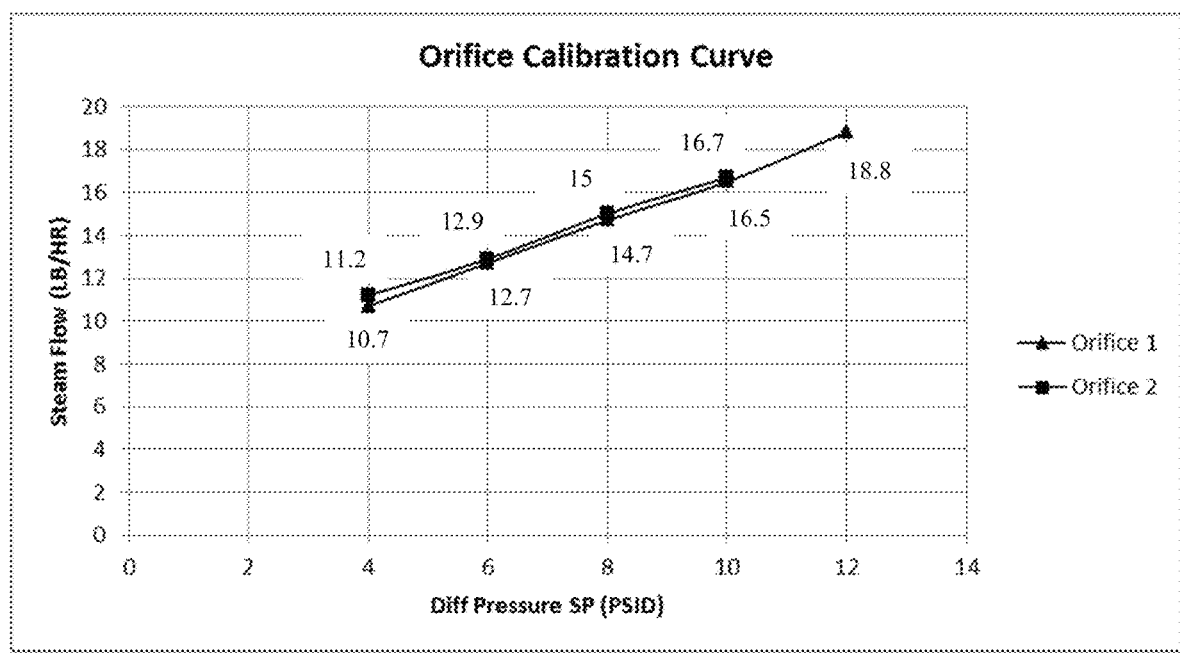
FIG. 5 shows a calibration curve of the relationship between average steam flow rate (lb/hr) exiting the water vaporizer and differential pressure set-point (psid) of the system.

For each differential pressure set-point, the system was allowed to run for approximately 20 minutes before a measurement of the change in weight of the water in the bladder tank was initially recorded. The differential pressure, combined with an orifice plate, allows for monitoring of the steam flow rate. Since pressure downstream of the orifice plate is about ambient, the pressures listed in Table 1 approximately equal the differential pressure across the orifice plate. Pressure values of Table 1 are also based on the structural design of the steam vaporizer vessel. Changes in weight were measured for approximately 45 minutes thereafter to calculate average rate of steam flow produced during that period. Standby cases were controlled by the temperature of the water inside the vessel. FIG. 5 reflects the almost linear relationship between average steam flow rate and differential pressure set-point. To achieve a desired steam flow of approximately 12.5 lb/hr, the water vaporizer is operated at 6 psid to produce saturated steam having a temperature about 230° F. (110° C.). At this operating differential pressure set-point, enough range in the system exists to allow for operation at a larger steam flow, if desired (i.e. 18.8 lb/hr at 12 psid). The cycle time for a 6 psid set-point (i.e. ~12.7 lb/hr average steam flow) with 4 gal/hr water inlet flow was 482±10 sec (62±5 sec open, 98±5 sec closed).

The system was subsequently switched from pressure control to temperature control and tuning parameters were adjusted accordingly.

Figure 6:
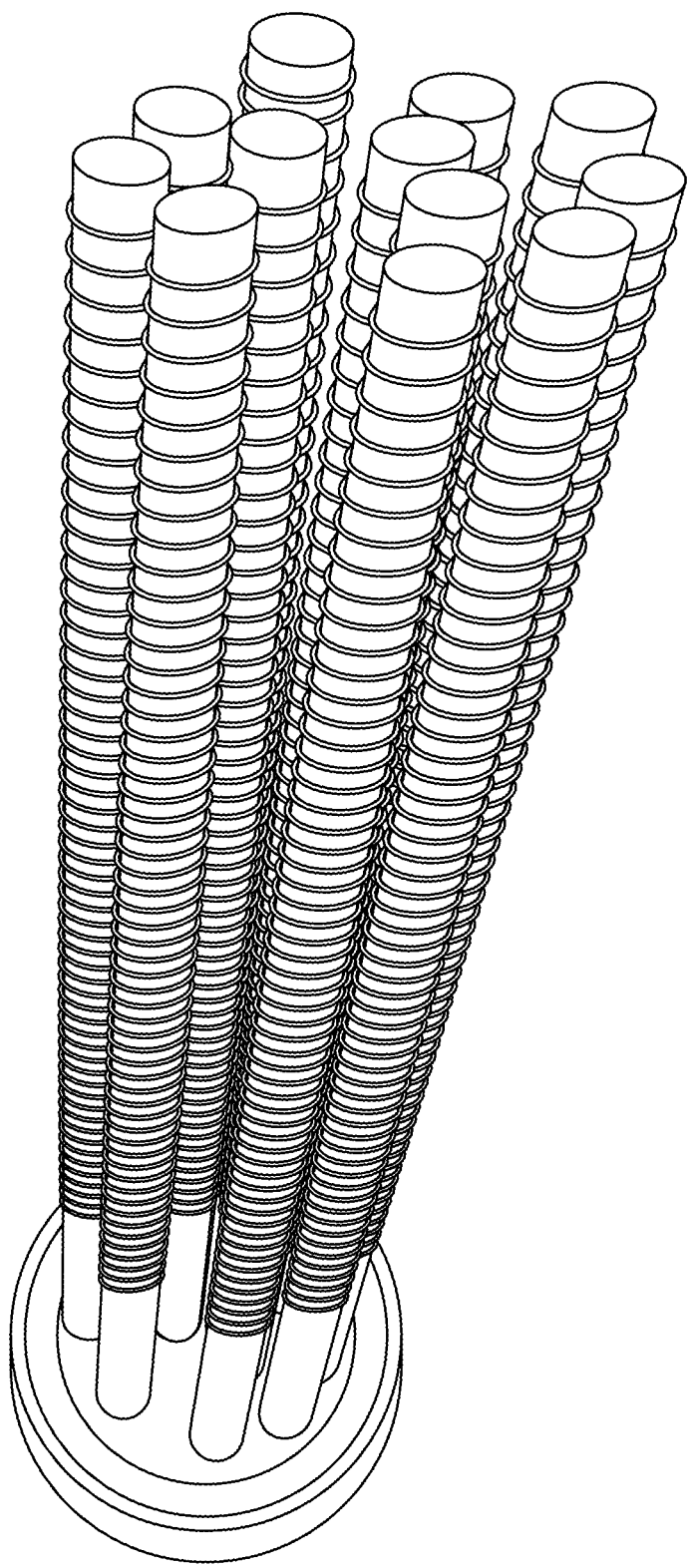
FIG. 6 shows a heating element according to one embodiment of the present disclosure.

After determination of optimum differential pressure set-points to achieve the desired 12.7 lb/hr average steam flow, water levels in the water vaporizer were heated using a low power density heating element inserted vertically through the bottom of the vessel in vertical orientation. In one embodiment, the heating element has a power density in a range of 10 W/in$^2$ to 500 W/in$^2$. In another embodiment, the heating element has a power density in a range of 30 W/in$^2$ to 100 W/in$^2$. FIG. 6 depicts heating rods according to one embodiment having diameter-to-length ratio of 1:20 and electrical characteristics of 240 V, 1000 W and a total power of 12 kW. In one embodiment, the heating rods may be standard, commercially available heater rods rather than rods having a custom heater core design. Commercially available heater rods offer the benefit of being readily available and inexpensive relative to the custom design. In another embodiment, any known or contemplated heater rods may be used. In one embodiment, the heating rods may be oversized to allow for a quick startup time to full steam production and while operating at lower power densities relative to low capacity heaters.

For all start-up cases (i.e. from a cold condition such as ambient temperature or a hot stand-by), output of the heating element was manually set to full capacity until differential pressure reached 80% of its set-point (4 psid); then, the differential pressure controller was switched to automatic control with a set-point of 6 psid. Start-up time was significantly shortened with the manual-automatic temperature ramp phase described herein (as compared to if controller was set to automatic for the entire temperature ramp). Startup time to reach steady-state was approximately 5 minutes for all cases, at which point, differential pressure was well-maintained at 6 psid.

Figure 7:
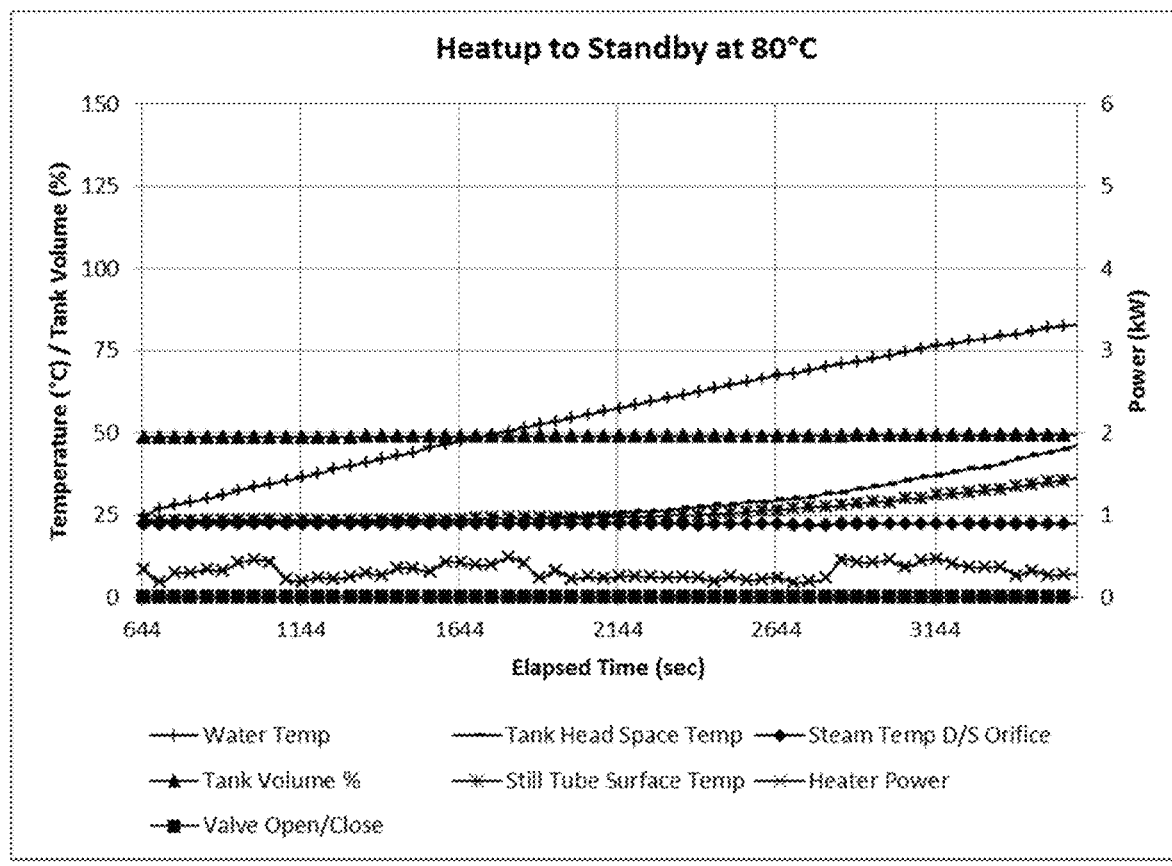
FIG. 7 shows a heating schedule from ambient conditions to stand-by at 80° C.; and, FIG. 8 shows a heating schedule from ambient conditions to at least the vaporization temperature of water.
Figure 8:
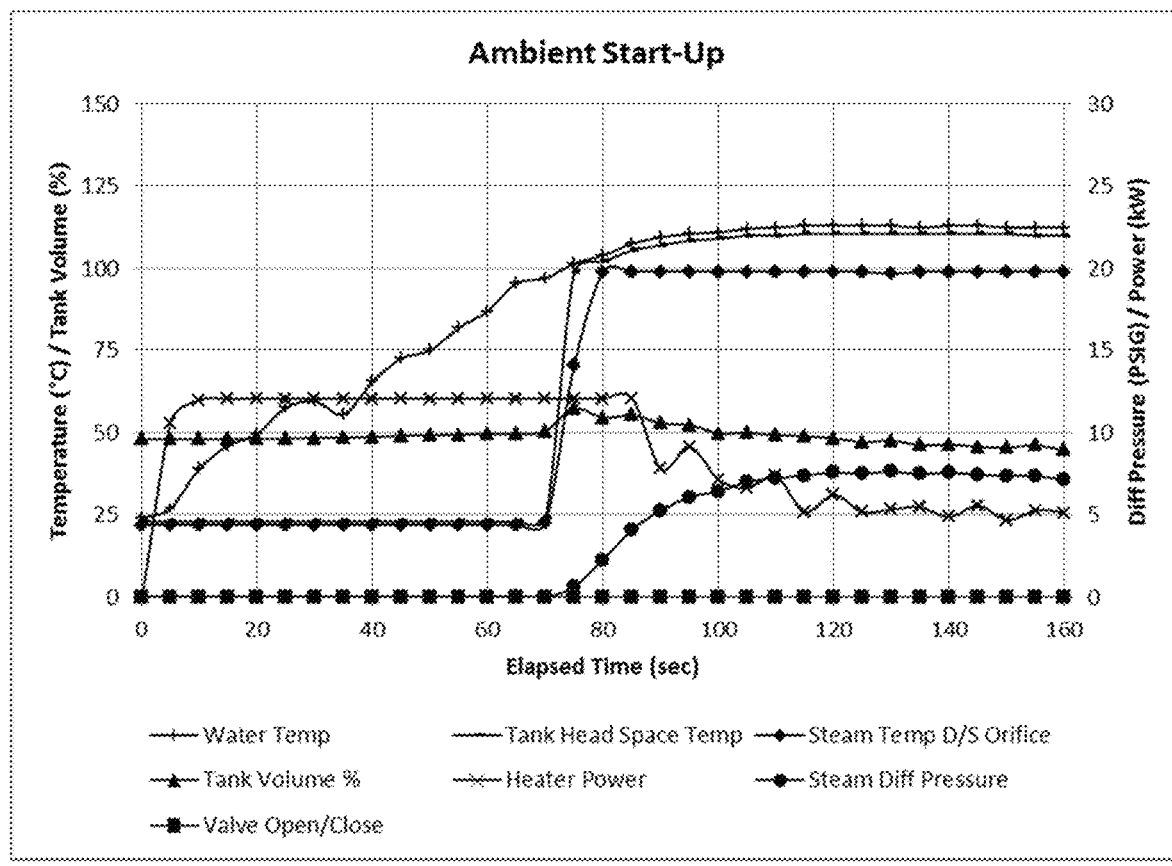

Starting up from a hot stand-by condition as opposed to a cold condition saved approximately 70 seconds when the heating element was running at full power. Additionally, start-up from a hot stand-by condition also substantially reduced the quantity of liquid water exiting with the steam through the water vaporizer outlet, though small amounts of water were present in steam flows exiting the vessel outlet in all hot stand-by cases. FIG. 7 depicts heating from ambient conditions at 25° C. to stand-by at 80° C. and FIG. 8 shows heating from ambient conditions at 25° C. to at least the vaporization temperature of water.

FIG. 7 shows a linear increase in water temperature over time at low power outputs of the heating element (about 0.25-0.50 kW) until the 80° C. stand-by temperature is reached. In this mode, minimal steam is produced, as the steam temperature remains constant at 25° C. FIG. 8 shows an alternative response, as water temperature reaches its 100° C. boiling point after approximately 70 seconds because of an initial surge in heating element output between 0 and about 10 seconds, followed by constant heating at about 12 kW till about 85 to 90 seconds. Once water temperature reaches 100° C., a corresponding surge in steam temperature rises from ambient conditions to steady-state 100° C., continuing even after water temperature increases past its boiling point. Water inlet flow was at 6 gal/hr. Water inlet flow was increased from 4 gal/hr to 6 gal/hr while maintaining differential pressure set-point constant to shorten cycle times and increase heating element output whenever the solenoid water feed valve was open due to larger variations in water temperature. Smaller water inlet flows provided better control in maintaining differential pressure set-points.

Figure 9:
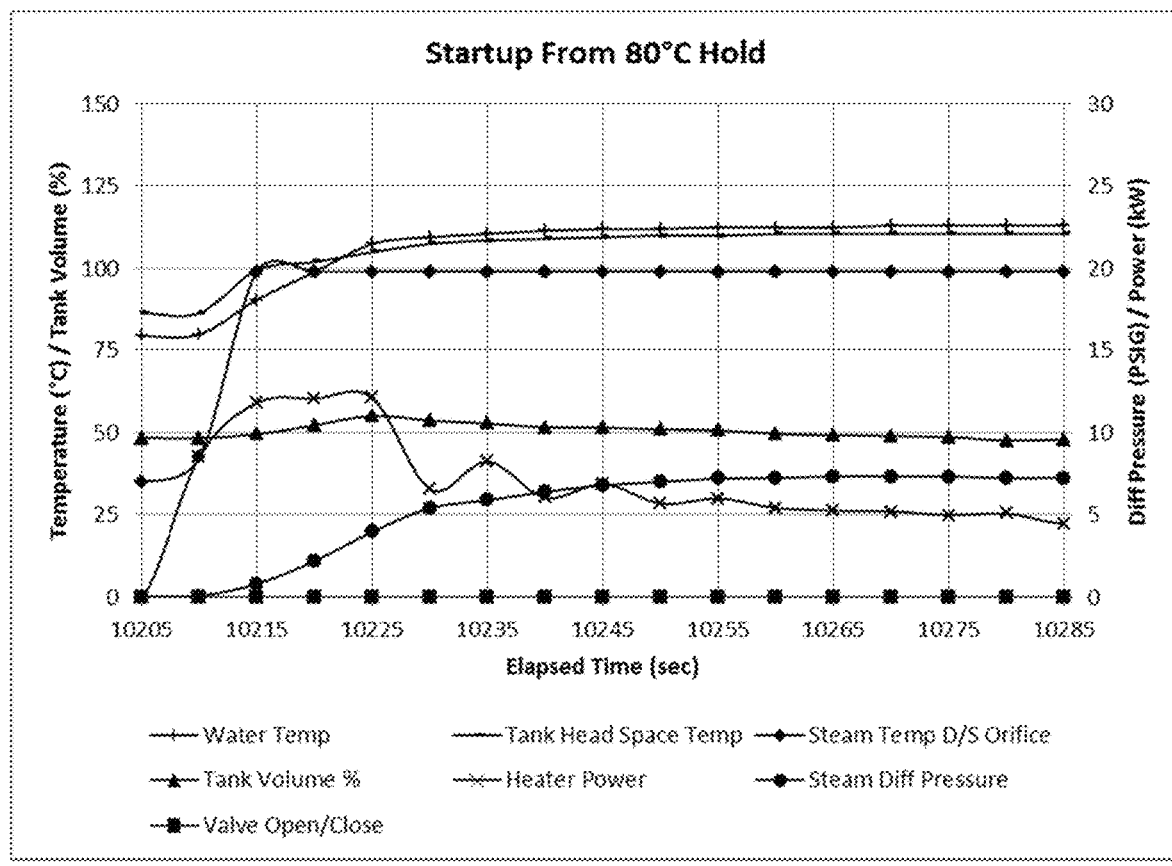
Figure 10:
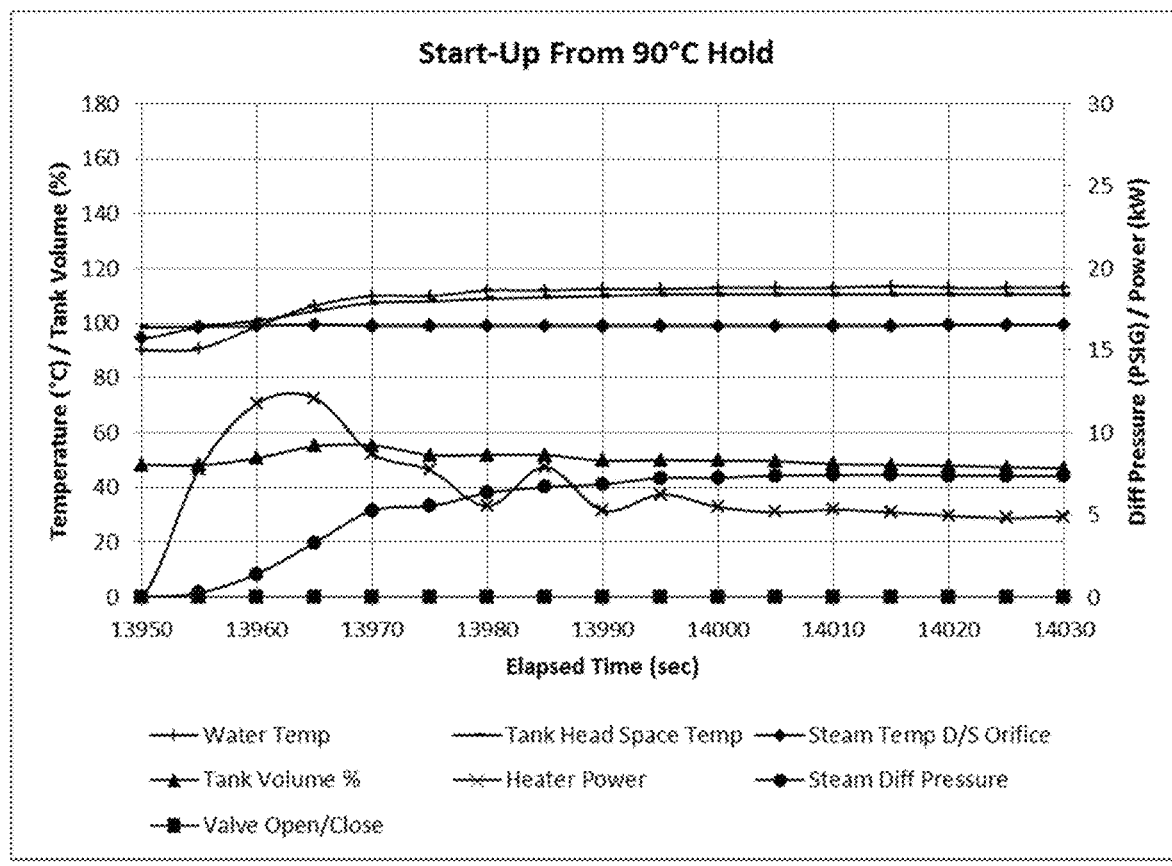

FIG. 9 depicts start-up heating from an 80° C. hot stand-by and FIG. 10 shows start-up heating from a 90° C. hot stand-by. As described above, in all start-up heating procedures, including the conditions shown in FIGS. 9 and 10, initial heating of the water is conducted manually at 100% capacity of the heating element until differential pressure reached 80% of its set-point, and then differential pressure controller was switched to automatic control. In both instances, power of the heating element is ramped for less than 10 seconds, allowed to equilibrate at approximately 12 kW, and then reduced. For start-up from an 80° C. hot stand-by (FIG. 9), water temperature reaches boiling point in about 13 to 14 seconds from the initial increase even though steam is produced in less than 10 seconds. For start-up from an 90° C. hot stand-by (FIG. 10), water temperature reaches boiling point even quicker, at about 7 to 8 seconds and steam is produced almost immediately. Starting up from 95° C. results (not shown) in an immediate steam production once initiated; however, the system experiences a greater loss in water level due to holding at such a high temperature (see Table 4 below).

The start-up times at different stand-by temperatures are summarized in Table 2. All parameters were the same other than the stand-by temperature of the water inside the vessel.

TABLE 2

Start-up time to reach 4 psid

| Stand-By Temperature (° C.) | 24 (ambient) | 80 | 90 | 95 |
|---|---|---|---|---|
| Start-Up Time to 4 PSID (sec) | 85 | 19 | 15 | 14 |

Figure 11:
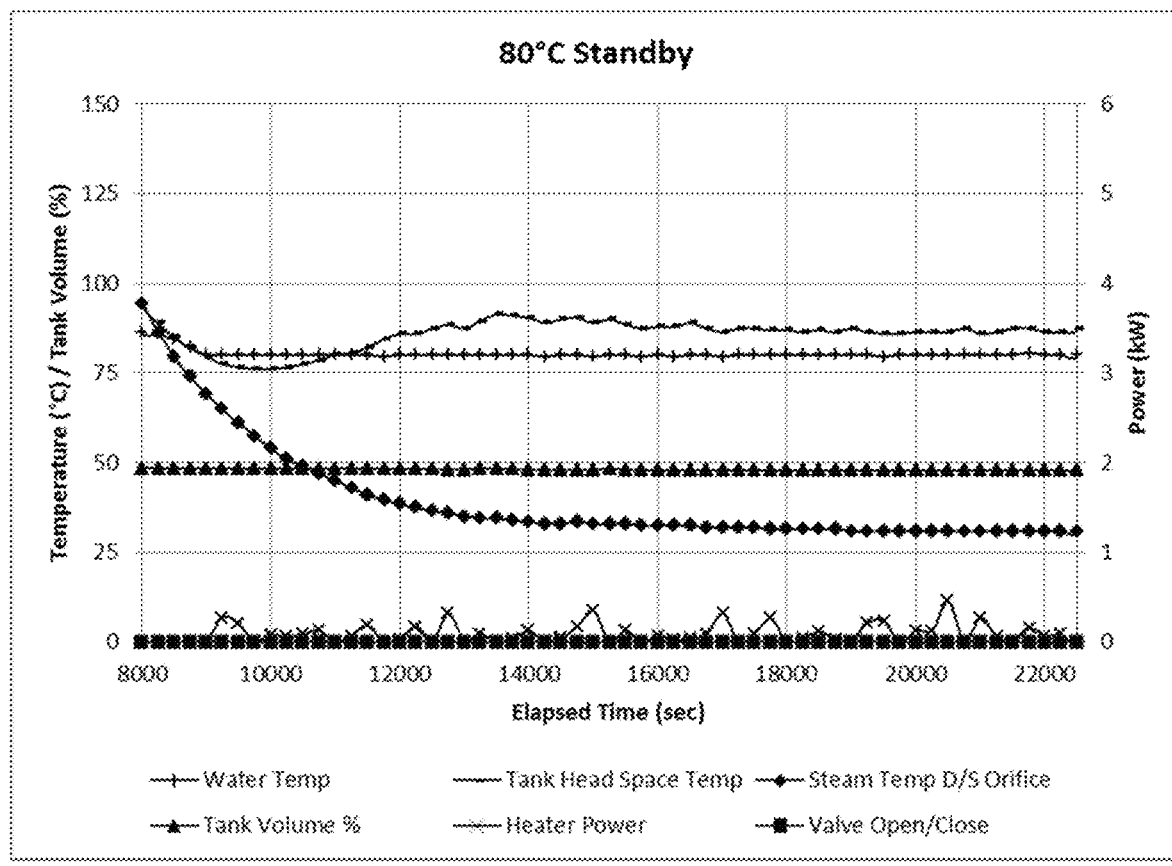
FIGS. 11 to 13 illustrate system conditions of stand-by at 80° C.
Figure 12:
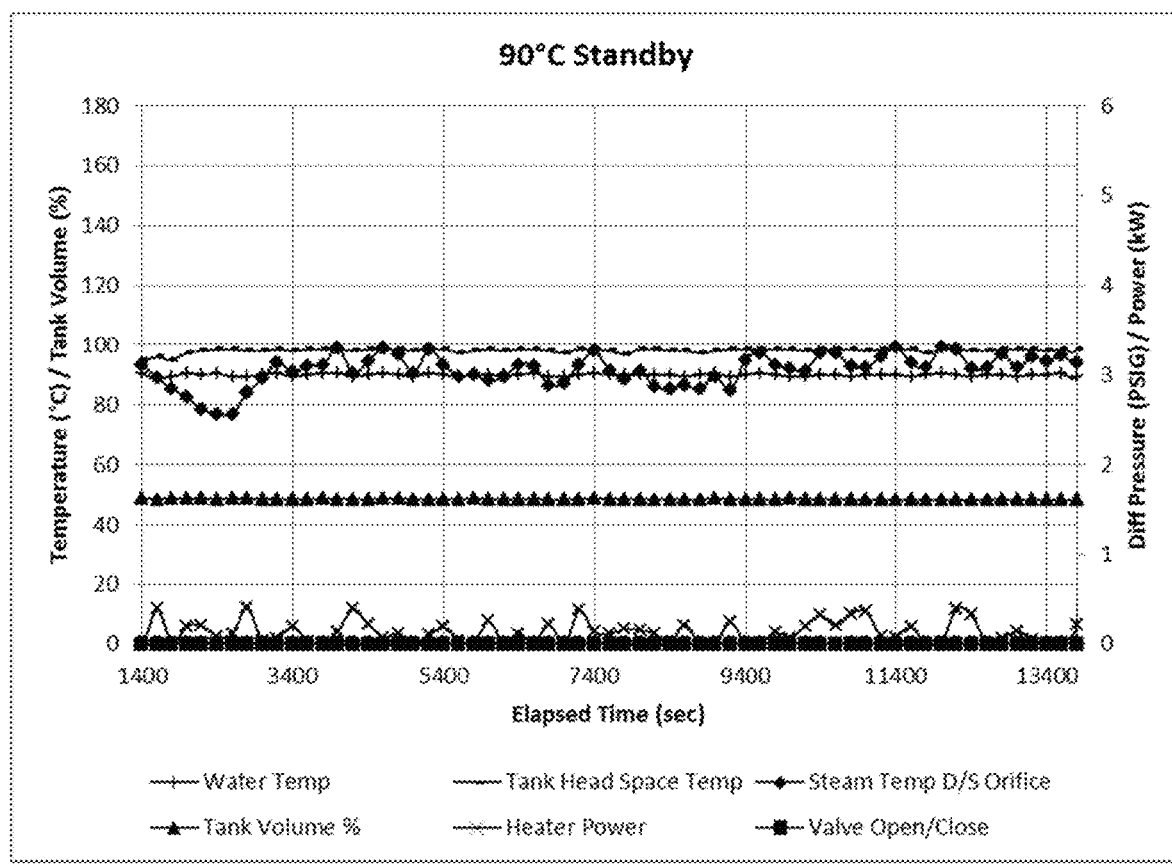
Figure 13:
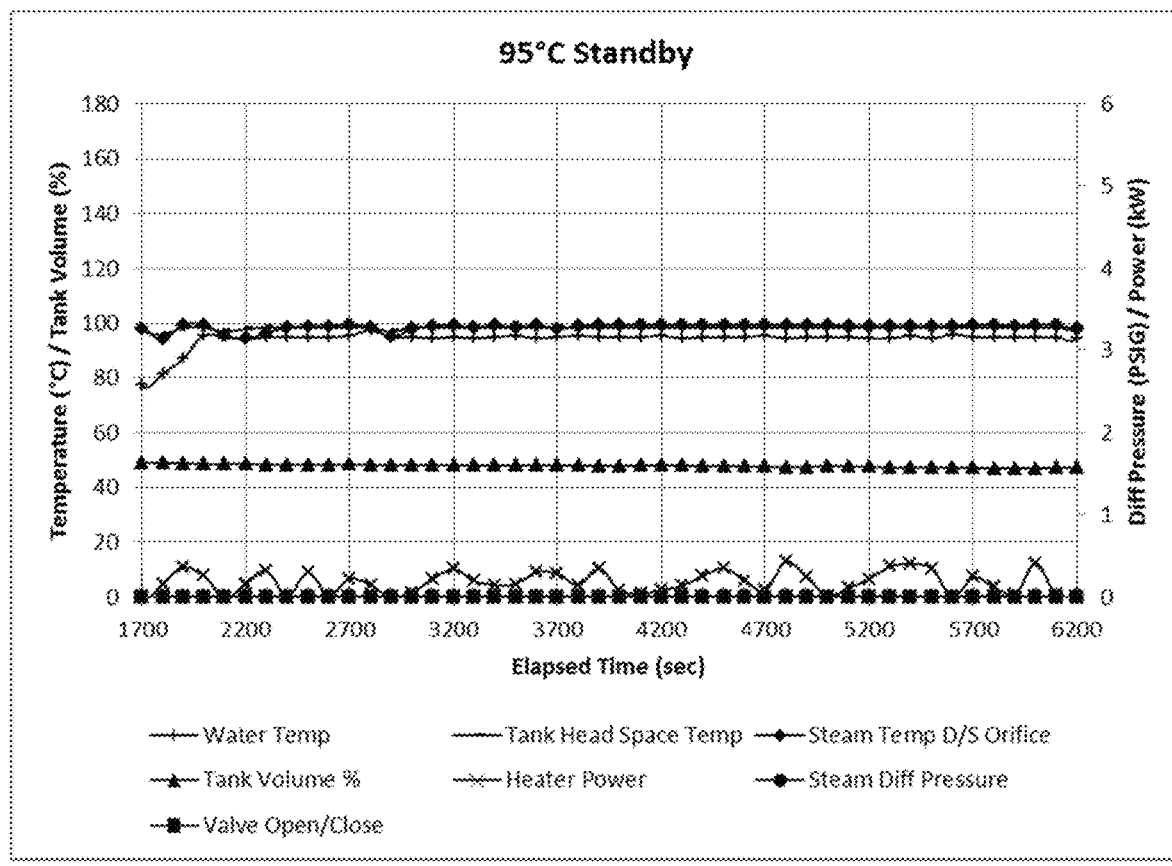

FIGS. 11 to 13 depict hot stand-by conditions at 80° C., 90° C., and 95° C., respectively. For each stand-by condition, the average and maximum heating element power is summarized in Table 3. In all cases, the heating element output was clamped at 5% (600 W).

TABLE 3

Power output of heating element during stand-by

| Stand-By Temperature (° C.) | 80 | 90 | 95 |
|---|---|---|---|
| Average Heating Element Power (W) | 115 | 139 | 177 |
| Maximum Heating Element Power (W) | 478 | 480 | 501 |

In cases, for example, when the fuel cell system is in active operation, water temperature may be decreased from 100° C. to and held in hot stand-by mode. FIGS. 11 to 13 illustrate dramatic differences in steam temperature at the vaporizer outlet orifice when conducted at 80° C. (about 30-35° C.), 90° C. (about 90-95° C.), and 95° C. (approximately 100° C.), respectively. Thus, starting up from 95° C. results in an immediate steam production once initiated. In addition, holding at higher stand-by temperatures also results in more frequent water droplets exiting concurrently with the steam through the water vaporizer outlet. Table 4 illustrates the rate of change in water level in the water vaporizer (assuming a constant rate of change) at different stand-by temperatures. Holding at 95° C. (FIG. 13) resulted in frequent water droplets exiting the steam outlet, which was significantly more than at 80° C. or 90° C. Minor drips of water at the steam outlet may be eliminated by using an external heating element, such as heating tape, heating cables or heating cords.

TABLE 4

Evaporation rate with stand-by temperatures

| Stand-By Temperature (° C.) | | 80 | 90 | 95 |
|---|---|---|---|---|
| Rate of Change in Water Level | %/hr | 0.069 | 0.046 | 0.92 |
| | mL/hr | 2.6 | 1.8 | 35 |

Water took approximately 50 minutes to heat from ambient temperature to 80° C. when the output of the heating element was clamped at 5% (FIG. 7). When an 80° C. stand-by temperature is reaches steady-state, water inside the vessel is maintained at approximately 80° C., tank head space temperature (empty space above the water level inside the vessel) equilibrates at about 87° C., and steam temperature is about 31° C. (FIG. 11). After 3.6 hours, the water level in the tank decreases by 0.25%, accounting for approximately 9 mL and corresponding to an evaporation rate of about 2.6 mL/hr or 0.7%/hr.

While the output of the heating element was clamped at 5%, the controller output varied freely, as required. As a result, whenever the high clamp took control, the controller output continued to rise and only returned under the high clamp after a time lag. When the water is heated from ambient temperature to 80° C. stand-by and again when the solenoid water feed valve is opened during stand-by, water temperature continued to rise past the set-point because the controller output was significantly ahead of the high clamp and was slowly returning under the high clamp. To avoid this, the temperature controller should be scaled from 0% at 0% heating element output to 100% at 5% heating element output.

Stand-by temperatures at 80° C. and 90° C. were controlled well with minimal changes due to water level evaporation. However, temperatures downstream from the vessel exit orifice repeatedly fluctuated when holding the water at 90° C. (FIG. 12). At 95° C., water level changes at this temperature were significantly more pronounced than at 80° C. or 90° C. (Table 4). Thus, holding the water temperature at a stand-by between 80° C. and 90° C. appears to be the most efficient in minimizing start-up time and changes in the water level.

Thus, by this exemplary embodiment, the performance of a water vaporizer was tested to optimize start-up time and time to reach steady-state production of steam, determine effects of the rate of water inlet flow, and determine effects on start-up when holding the water at elevated temperatures. To achieve a desired steam flow of approximately 12.5 lb/hr, the water vaporizer operated at a differential pressure set-point of 6 psid, which produced saturated steam at a temperature about 230° F. (110° C.). Water inlet flow was set based on the requirements of the system. For example, smaller water inlet flows (i.e. 4 gal/min) provided better control in maintaining differential pressure set-points while higher water inlet flows (i.e. 6 gal/min) allowed for shortened cycle times and increased heating element outputs when the solenoid water feed valve was open due to larger variations in water temperature.

Holding conditions were tested at 80° C., 90° C., and 95° C. Holding at 95° C. resulted in higher rates of change in water level in the water vaporizer due to greater amounts of water droplets exiting the steam outlet. Holding the water temperature at a stand-by temperature between 80° C. and 90° C. best minimizes start-up time and changes in the water level. Preferably, stand-by temperatures may range from about 80° C. or about 81° C. or about 82° C. or about 83° C. or about 84° C. or about 85° C. or about 86° C. or about 87° C. or about 88° C. or about 89° C. to or about 90° C. or about 89° C. or about 88° C. or about 87° C. or about 86° C. or about 85° C. or about 84° C. or about 83° C. or about 82° C. or about 81° C., and combinations thereof. Preferably, stand-by temperatures may range from about 80° C. to about 90° C., or from about 81° C. to about 89° C., or from about 82° C. to about 88° C., or from about 83° C. to about 87° C., or from about 84° C. to about 86° C. Preferably, stand-by temperatures may be about 80° C., or about 81° C., or about 82° C., or about 83° C., or about 84° C., or about 85° C., or about 86° C., or about 87° C., or about 88° C., or about 89° C., or about 90° C.

Rapid heating from stand-by conditions is conducted by initially heating water in the water vaporizer manually at complete capacity of the heating element until differential pressure reached approximately 80% of its set-point, and then switching the differential pressure controller to automatic control. In this manual-automatic temperature ramp phase, start-up time is significantly shortened with minimal water loss due to evaporation, as compared with setting the controller to automatic for the entire temperature ramp. Moreover, the described heat schedule also aides in freeze protection of and biological growth prevention in the water of the vaporizer.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the claims.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the Figures. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present application. For example, the heat recovery heat exchangers may be further optimized.

What is claimed is:

1. A method of producing steam in a fuel cell system, the method comprising: providing an internal steam generator that comprises a vessel; and opening a water feed valve to allow water into the vessel when the water level drops below a lower control point, and closing the water feed valve when the water level reaches an upper control point, thereby maintaining a water level of the water in the vessel between the lower control point and the upper control point, while the fuel cell system is producing power in a water neutral mode, maintaining the water in the vessel at a stand-by temperature between about 80° C. and about 90° C., and while the fuel cell system is not producing power in a water neutral mode, heating the water in the vessel from the stand-by temperature to a temperature at or above a vaporization temperature of the water using a heating element to generate steam, and using the steam in a reforming reaction within the fuel cell system, wherein the fuel cell system producing power in a water neutral mode corresponds to the fuel cell system producing 30% or more power load, and wherein the fuel cell system not producing power in a water neutral mode corresponds to the fuel cell system producing less than 30% power load.

2. The method of claim 1, wherein the heating element is a low power density heater.

3. The method of claim 2, wherein the heating element is an inductive heating coil positioned around the vessel exterior.

4. The method of claim 1, wherein the steam is generated at generation rate of between 10 lb/hr and 40 lb/hr.

5. The method of claim 1, wherein the water level is monitored in a water level tube fluidly coupled to the vessel.

* * * * *